US011855401B2

(12) United States Patent
Wang et al.

(10) Patent No.: US 11,855,401 B2
(45) Date of Patent: Dec. 26, 2023

(54) DISPENSABLE GREASE SEALANTS, METHOD FOR PRODUCING SAME, CRIMP CONNECTION, METHOD FOR PRODUCING SAME, AND USE OF THE DISPENSABLE GREASE SEALANTS

(71) Applicants: TE Connectivity Germany GmbH, Bensheim (DE); TE Connectivity Corporation, Berwyn, PA (US)

(72) Inventors: Lei Wang, San Jose, CA (US); Soenke Sachs, Frankfurt (DE); Ting Gao, Palo Alto, CA (US); Dejie Tao, Fremont, CA (US); Helge Schmidt, Speyer (DE)

(73) Assignees: TE Connectivity Germany GmbH, Bensheim (DE); TE Connectivity Solutions GmbH, Schaffhausen (CH)

( * ) Notice: Subject to any disclaimer, the term of this patent is extended or adjusted under 35 U.S.C. 154(b) by 594 days.

(21) Appl. No.: 16/902,580

(22) Filed: Jun. 16, 2020

(65) Prior Publication Data
US 2020/0412029 A1 Dec. 31, 2020

(30) Foreign Application Priority Data

Jun. 27, 2019 (EP) ..................... 19182941

(51) Int. Cl.
*H01R 4/70* (2006.01)
*C10M 169/02* (2006.01)
*C08G 77/442* (2006.01)
*C08K 3/36* (2006.01)
*C08L 23/14* (2006.01)
*C08L 83/10* (2006.01)
*H01B 3/46* (2006.01)
*H01R 4/18* (2006.01)
*H01R 43/048* (2006.01)
*H02G 1/14* (2006.01)
*H02G 15/04* (2006.01)

(52) U.S. Cl.
CPC ............ *H01R 4/70* (2013.01); *C08G 77/442* (2013.01); *C08K 3/36* (2013.01); *C08L 23/145* (2013.01); *C08L 83/10* (2013.01); *C10M 169/02* (2013.01); *H01B 3/465* (2013.01); *H01R 4/18* (2013.01); *H01R 43/048* (2013.01); *H02G 1/14* (2013.01); *H02G 15/04* (2013.01); *C08K 2201/005* (2013.01); *C08L 2201/56* (2013.01); *C08L 2203/206* (2013.01); *C08L 2207/324* (2013.01)

(58) Field of Classification Search
CPC .................................................... C10M 169/02
See application file for complete search history.

(56) References Cited

U.S. PATENT DOCUMENTS

| | | | |
|---|---|---|---|
| 3,893,961 A | 7/1975 | Walton et al. | |
| 4,370,023 A | 1/1983 | Lange et al. | |
| 4,721,832 A | 1/1988 | Toy | |
| 5,478,385 A | 12/1995 | Washbourne | |
| 5,558,807 A | 9/1996 | Kim | |
| 5,560,848 A | 10/1996 | Kim | |
| 6,080,301 A | 6/2000 | Berlowitz et al. | |
| 6,103,099 A | 8/2000 | Wittenbrink et al. | |
| 6,245,722 B1 | 6/2001 | Maples et al. | |
| 6,503,526 B1* | 1/2003 | Krzysik | A61K 8/0208 424/443 |
| 6,713,438 B1 | 3/2004 | Baillargeon et al. | |
| 7,989,409 B2 | 8/2011 | Poirier | |
| 8,956,699 B2 | 2/2015 | Rau et al. | |
| 9,103,499 B2* | 8/2015 | Lindner | F17C 1/06 |
| 9,487,727 B2 | 11/2016 | Meijer et al. | |
| 9,556,396 B2 | 1/2017 | Germaine et al. | |
| 9,574,159 B2 | 2/2017 | Matsubara et al. | |
| 9,787,005 B2 | 10/2017 | Bluemmel et al. | |
| 2004/0154958 A1 | 8/2004 | Alexander et al. | |
| 2006/0089274 A1 | 4/2006 | Sarkis et al. | |
| 2007/0093396 A1 | 4/2007 | Okazaki | |
| 2007/0138053 A1 | 6/2007 | Baillargeon | |
| 2009/0088354 A1 | 4/2009 | Berry et al. | |
| 2009/0170738 A1 | 7/2009 | Fujinami et al. | |
| 2009/0258802 A1 | 10/2009 | Hagan et al. | |
| 2011/0249923 A1 | 10/2011 | Lim et al. | |
| 2014/0239760 A1 | 8/2014 | Asai et al. | |
| 2017/0183603 A1 | 6/2017 | Imai et al. | |
| 2017/0275558 A1 | 9/2017 | Saito et al. | |

FOREIGN PATENT DOCUMENTS

| | | |
|---|---|---|
| CN | 101831106 A | 9/2010 |
| CN | 103666370 B | 7/2015 |
| DE | 102013205235 A1 | 9/2014 |
| DE | 102014204358 A1 | 9/2015 |
| JP | H09194867 A | 7/1997 |
| JP | 2005015723 A | 1/2005 |
| JP | 2008195799 A | 8/2008 |
| JP | 2008208199 A | 9/2008 |
| JP | 2010018734 A | 1/2010 |
| JP | 2012224834 A | 11/2012 |
| JP | 2014040518 A | 3/2014 |
| JP | 2017031282 A | 2/2017 |
| JP | 2017145284 A | 8/2017 |
| KR | 860000694 B1 | 6/1986 |
| KR | 20050022236 A | 3/2005 |
| WO | 2003038016 A1 | 5/2003 |
| WO | 2009121378 A1 | 10/2009 |
| WO | 2012054072 A1 | 4/2012 |

(Continued)

OTHER PUBLICATIONS

Machine translation of JP 2005-015723 A, published Jan. 20, 2005.*

(Continued)

*Primary Examiner* — Vickey Nerangis
(74) *Attorney, Agent, or Firm* — Barley Snyder

(57) ABSTRACT

A dispensable grease sealant includes a base component in an amount of 50 wt % or more, based on a total weight of the sealant, and a thickener. The base component is selected from a group including a silicone wax, a liquid rubber, and a combination thereof.

18 Claims, No Drawings

(56) References Cited

FOREIGN PATENT DOCUMENTS

WO      2017168868 A1    10/2017
WO      2018061134 A1    4/2018

OTHER PUBLICATIONS

Extended European Search Report, Application No. 19182941.5, dated Jan. 7, 2020, 8 pages.

* cited by examiner

DISPENSABLE GREASE SEALANTS, METHOD FOR PRODUCING SAME, CRIMP CONNECTION, METHOD FOR PRODUCING SAME, AND USE OF THE DISPENSABLE GREASE SEALANTS

CROSS-REFERENCE TO RELATED APPLICATION

This application claims the benefit of the filing date under 35 U.S.C. § 119(a)-(d) of European Patent Application No. 19182941.5, filed on Jun. 27, 2019.

FIELD OF THE INVENTION

The present invention relates to a dispensable grease sealant and, more particularly, to a dispensable grease sealant that can be used for sealing a crimp connector with a wire inserted into the crimp connector.

BACKGROUND

Grease compositions, comprising base components, waxes and thickeners, are generally known for various lubricating applications. For instance, JP 2014040518 A discloses a grease composition having an excellent coatability and adhesion, as well as an improved heat resistance and rust resistance. US 2017/0183603 A1 relates to a lubricant composition for an eccentrically oscillating speed reducer of a planetary gear type. US 2017/0275558 A1 shows a grease composition used for lubricating a mechanical part having a steel portion to be lubricated. These commonly known grease compositions have lubricating properties and usually contain synthetic oils or mineral oils. The lubrication function is imparted by generating an oil film, which also may provide a certain sealing. The common grease compositions must have a low viscosity and a low friction.

Further, grease compositions may act as sealants for various purposes, including crimp connections. For instance, crimp connections are disclosed in WO 2012054072 A1, DE 102013205235 A1 and DE 102014204358 A1. A crimp connection is a means to facilitate, for example, electrical connections of wires or cables, as the use of a solder is no longer required. A cable or wire is introduced into a cavity of a crimp connector (which enables a simple and reliable mechanical and electrical connection of cables) and the crimping process (using typically specifically designed tools) secures a tight connection between cable/wire and crimp connector.

In this regard, it is often mandatory that the cavity of the crimp connector is filled with a sealant in order to ensure proper insulation and protection of the cable/wire. It has been proven advantageous if, during the production of the crimp connector, the cavity of the crimp connector is filled or covered with a sealant by dispensing a certain amount of the sealant at elevated temperatures. During the subsequent crimp application, a wire or cable is inserted into the cavity of the crimp connector and fixed in order to join these components, whereby a sealing of the parts by the grease composition is further intended. This requires specific properties of the sealant, such as a sufficient dispensability to ensure high speed production feasibility, high viscosity at room temperature to ensure positional stability in the cavity of the crimp connector after production and during storage as well as sufficient storage stability (as crimp connectors, after production, are often stored for a prolonged period of time), and the ability to sufficiently seal a wire or cable that is inserted into the cavity of the crimp connector after the crimping process.

Commonly known grease compositions, which act as lubricants, do not show the required combination of properties, which makes them inappropriate for such an application. The commonly known grease compositions either have a low positional stability, insufficient sealing ability or cannot be dispensed properly. Further, the processing window of commonly known grease compositions is insufficiently narrow. In view of this, there exists a need for dispensable sealants, which show this specific combination of properties. Moreover, commonly known grease compositions, and particular lubricants, show a significant oil release. This makes them inappropriate for the use in crimp connections, since released oil results in an unfavorable increased electrical resistance of the crimp connection.

SUMMARY

A dispensable grease sealant includes a base component in an amount of 50 wt % or more, based on a total weight of the sealant, and a thickener. The base component is selected from a group including a silicone wax, a liquid rubber, and a combination thereof.

DETAILED DESCRIPTION OF THE EMBODIMENT(S)

The present invention will be described in greater detail by way of example using several embodiments. The embodiments merely represent possible configurations in which individual features can be realized and omitted independently of each other.

According to a first embodiment of the dispensable grease sealant, the dispensable grease sealant comprises a base component in an amount of 50 wt % or more, based on the total weight of the sealant, and a thickener. The base component is selected from the group comprising a silicone wax, a liquid rubber or a combination thereof.

The dispensable grease sealant comprises the base component in an amount of 50 wt % or more, based on the total weight of the sealant. In embodiments, the base component is in an amount of 60 wt % or more, such as 65 wt % or more, 70 wt % or more, or 80 wt % or more in various embodiments. The upper limit of the amount of base component in the composition is not limited. In other embodiments, the amount may be 95 wt % or less, or 98 wt % or less. Accordingly, in embodiments of the invention, the base component may be present in an amount of from 50 to 98 wt %, 60 to 98 wt %, 60 to 95 wt %, or 70 to 95 wt %.

The specific nature and high amount of the base component ensures that the dispensable grease sealant is dispensable at the dispensing temperature with a broad processing window. The dispensing temperature is not particularly limited, but is higher than ambient temperature of 25° C., and may be set to a temperature in the range of from 50° C. to 200° C., or in a range of 60° C. to 150° C.

In particular embodiments, the dispensing temperature is approximately 100° C. The term "dispensable" in terms of the present invention defines that the grease sealant is able to be dispensed into a cavity of a crimp connection at the dispensing temperature. The device for dispensing the grease composition is not particularly limited and includes commonly known dispensing devices. The dispensing may be conducted by applying pressure.

A broad dispensing processing window means that the dispensing temperature and pressure may be varied relatively broadly, while still obtaining a sufficient dispensing. This broad processing window can be explained by the fact that the viscosity of the grease sealant is reduced during the dispensing process, which ensures that the grease conveniently flows into the cavity of a crimp connector. In this regard it has been found that the base component should have shear thinning characteristics, which means that it shows a thixotropic behavior under a shear as applied during the dispensing process. This ensures that the sealant composition can be successfully applied in high speed production processes.

In addition, an excellent sealing performance is achieved with the sealant according to the first embodiment. During crimp application, a wire or cable is inserted into the cavity of the crimp connection and crimping is made at a certain pressure (typically of approximately 0.5 bar). The composition of the sealant according to the first embodiment enables a sufficient fluidity of the sealant during the crimping process, so that the remaining cavities of the connector are completely filled and a good sealing and insulation of the cable/wire is ensured. If shear thinning characteristics are present, this allows even more that the grease composition easily flows even into small areas of the cavity. Thereby an excellent sealing is achieved. In view of this, the inventive dispensable grease sealant also provides an improved corrosion resistance.

Excellent sealing performance is particularly achieved, when a wire or cable that is inserted into the cavity of the crimp connection filled with the grease sealant, passes a thermal shock test according to standard IEC 60068-2-14. The crimp connection undergoes 100 cycles of a cooling and heating process from −40° C. to 125° C. The dwell time at low/high temperature is each 30 minutes, the transition duration between the temperature extremes needs to be shorter than 30 s. The electrical resistance of the wire after the thermal shock test must not exceed the initial resistance of the wire plus 2 mOhm. The inventive dispensable grease sealants all pass the thermal shock test.

A further test for evaluating the sealing performance is the cyclic salt spray test according to DIN EN 60068-2-52, where no wash out is allowed for proper protection against corrosion. This test is performed using "Nordic salt" (3%-salt solution, with 95% NaCl, 2.5% $MgCl_2$ and 2.5% $CaCl_2$) for 7 days with repeating salt spray and humidity exposure cycles. A sample passes this test, when the maximum resistance increases between 0.4 and 0.7 mOhms. The inventive dispensable grease sealants all pass the cyclic salt spray test.

Another test for the sealing performance is to test sealing against air pressure of up to 0.5 bar according to the Toyota specification TSC1232G. The parts need to seal against compressed air, which is applied to the not-connected part of the wire isolation. The crimped part is submerged in water and no air bubbles are allowed to appear up to a compressed air pressure of 0.5 bar. The inventive dispensable grease sealants all pass this sealing performance test.

Moreover, the specific base component ensures that the viscosity of the grease composition at ambient temperature of 25° C. and without application of shear is relatively high. In consequence, the storage stability becomes excellent, since the sealant composition completely remains in the cavity of the crimp connection. Required storage times are up to approximately 2 years. This also means that the sealant, during the crimping process, does not easily get dispensed to the outside of the crimp connector.

Further, the dispensable grease sealant according to the first embodiment ensures that crimping can be carried out over a broad processing window. This particularly means that the crimping application can be accomplished at high and low temperatures, including temperatures below 0° C. as well as higher temperatures during summer months or in industrial high temperature environments. This is an important aspect for end users. In embodiments, the dispensable grease sealant is suitable for automotive applications, which means that the sealant must withstand environmental temperatures of up to 125° C.

The dispensable grease sealant further comprises a thickener. The nature of the thickener is not limited. In an embodiment, the thickener is selected from the group comprising inorganic fillers, such as silica, or clay, organic fillers, such as a polymeric powder, metal components, such as lithium and/or calcium complexes, or any combination thereof. The amount of thickener is not particularly limited. Suitable exemplary amounts are in the range of from 1 wt % to 30 wt %, 2 to 20 wt %, or from 3 wt % to 15 wt %. The thickener enables a further adjustment of the viscosity of the dispensable grease sealant, in order to meet specific requirements in relation with excellent dispensing performance, sealing performance and storage stability, such as discussed above in connection with the base component. In addition, some fillers may also further improve the shear thinning properties of the composition.

In an embodiment, the thickener is fumed silica, since this component shows a strong shear thinning effect in the dispensable grease sealant. Polymeric fillers are also effective thickeners, since they have a similar density to the base component and thus allow an easy processing.

In an embodiment, the viscosity of the dispensable grease sealant at ambient temperature of 25° C. is dependent on the applied shear rate, which means that particularly sufficient shear thinning characteristics are exhibited. Namely, the viscosity at 25° C. at a shear rate of 0.1 $s^{-1}$ is 1000 Pa·s or more, 5000 Pa·s or more, or 10000 Pa·s or more, and that the viscosity at 25° C. at a shear rate of 1000 $s^{-1}$ 100 Pa·s or less, 10 Pa·s or less, or 1 Pa·s or less. This ensures a particularly improved sealing performance.

The viscosity is measured as follows: A sample is analyzed on a TA Instruments ARES-G2 rotational rheometer equipped with Advanced Peltier System (APS) and an upper 25 mm stainless steel parallel plate fixtures. The APS is capable of temperature accuracy of ±0.1° C. enabled by a platinum resistance thermometer (PRT). By means of a spatula, the sample is deposited onto an APS flat plate. After adjusting the measurement temperature, the sample is compressed to achieve the desired gap pre-set to 1.2 mm. A steady rotational shear is executed to measure the viscosity from 0.1 $s^{-1}$ to 1000 $s^{-1}$. An APS plate split solvent trap is used to avoid the drying of the sample and moisture uptake.

Alternatively or additionally, the viscosity of the dispensable grease sealant according to the first embodiment at elevated temperatures is dependent on the applied shear rate. This particularly means that at 100° C. and at a shear rate at 0.1 $s^{-1}$, the viscosity is 10 Pa·s or more, 100 Pa·s or more, or 1000 Pa·s or more, and at a shear rate at 100° C. and at 1000 $s^{-1}$, the viscosity is 10 Pa·s or less, 1 Pa·s or less, or 0.5 Pa·s or less. This ensures particularly improved dispensing properties. The shear rate is measured by adjusting a certain shear rate and measuring the viscosity as above.

In an embodiment, the base component is thixotropic at ambient temperature of 25° C. and at the dispensing temperature. The term "thixotropic" means that the viscosity of the base component decreases upon application of shear and is a synonym for good shear thinning characteristics. Thixotropic properties of the base component are particularly efficient to adjust the desired viscosity properties of the dispensable grease sealant. Therefore, the dispensing and sealing performance of the grease sealant can be further improved.

One embodiment of the base component is a silicone wax. Silicone waxes are solid at ambient temperature of 25° C. Thus, they ensure excellent storage properties, even when using a relatively low amount of thickener. Further, particularly favorable viscosity and thixotropic properties can be achieved by employing a silicone wax as the base component. Thus, the dispensing and sealing performance becomes excellent. The nature of the silicone wax is not particularly limited. A wax according to an embodiment includes siloxane based repeating units, which may be selected among those customary for silicone waxes and which include alkyl- or aryl-substituted siloxane repeating units. Suitable examples are dimethylsiloxane derived waxes or waxes with mixed alkyl residues or copolymers of different siloxane repeating units. Particular embodiments may be polydimethylsiloxanes, optionally modified with a high molecular weight hydrocarbon. In an embodiment, the silicon wax is a methylsiloxane polymer, such as an ethylene methylsiloxane co-polymer. In embodiments, the silicone wax is a block copolymer of ethylene and methylsiloxane. In another embodiment, the silicone wax is a silicone copolymer containing a hydrocarbon chain, having 6 or more carbon atoms. Suitable silicone waxes are commercially available. Suitable silicone waxes are for instance Dow Corning® SW-8005 C30 (C30-45 alkyldimethylsilyl-polypropylsilsesquioxane).

In an embodiment, the silicone wax has a viscosity at 25° C. of 1000 Pa·s or more, 5000 Pa·s or more, or 10000 Pa·s or more, and/or a viscosity at 100° C. of 1000 Pa·s or less, 100 Pa·s or less, or 10 Pa·s or less. Alternatively or additionally, the silicone wax has a melting and/or softening temperature of 35° C. or higher and a melting and/or softening temperature of equal to or lower than dispensing temperature. These properties ensure particularly preferred dispensing and sealing performances. The viscosity is measured as described above with a shear rate of $0.1\ s^{-1}$.

The base component may also be a liquid rubber. Liquid rubbers have the advantage that they are commercially available at low costs. Further, they do not emit any volatiles during storage and operation. "Liquid" in terms of the present application means that the viscosity at ambient temperature of at 25° C. is 100000 Pa·s or less. The liquid rubber shows a rather high viscosity in order to reduce oil release and to improve the sealing properties and the storage properties. Thus, the viscosity of the liquid rubber, in various embodiments, may be 75000 to 10000 Pa·s, 60000 to 20000 Pa·s, or 50000 Pa·s, at ambient temperature of 25° C. The viscosity is measured as described above with a shear rate of $0.1\ s^{-1}$. The nature of the liquid rubber is not limited. The liquid rubber may be synthetic or natural rubbers, such as polybutylene rubbers, polyisoprene rubbers nitrile rubbers, etc. Suitable liquid rubbers are commonly known and commercially available.

These two components for the base component can be used alone or in combination in order to exhibit the combination of favorable effects. If used in combination, favorable weight ratios are from 10:90 to 90:10, 25:75 to 75:25, or 50:50. A combination of the two components ensures a particularly balanced performance.

In various embodiments, the dispensable grease sealant further comprises one or more additives. The nature of the additive is not limited. In an embodiment, the additive is selected from the group comprising antioxidants, antiwear additives, extreme pressure additives, corrosion inhibitors, colorants, and fluorescence agents, and any combination thereof. These additives are commonly known and may be added upon the circumstances in order to impart the sealant composition with the desired properties. Each additive typically is present in an amount of 2 wt % or less, 1 wt % or less, or 0.5 wt % or less, based on the total amount of the grease sealant. The total amount of such additives typically is 5 wt % or less, such as from 1 to 5 or 2 to 4 wt %.

In an embodiment, the dispensable grease sealant may further comprise a wax additive. The term "wax additive" means a wax in addition to the silicone wax that is employed as the base component. The nature of the wax is not limited as far as it is different from the silicone wax. In an embodiment, the wax additive may be selected from the group comprising a plant- or animal-derived wax, a petroleum-derived wax or a synthetic wax. Examples of suitable wax additives include hydrocarbon waxes, polyethylene waxes, polypropylene waxes, paraffin waxes, fluor-containing waxes, such as fluorocarbon waxes, microcrystalline waxes, such as polypropylene-based micropowders, silicone waxes, or any combination thereof. In an embodiment, the wax additive is present in case, when the base component is selected from a liquid rubber, since the viscosity and the viscosity temperature/shear thinning properties can be then adjusted in an excellent way. Furthermore, the wax additive works as a thickener at ambient temperature. The wax additive may be present in an amount of 50 wt % or less, 30 wt % or less, or 20 wt % or less, based on the total amount of the grease sealant.

In an embodiment, the base component and the wax additive are immiscible or only partially miscible at 25° C. and that the base component and the wax additive are miscible at the dispensing temperature. Such a behavior particularly ensures that the grease sealant has a high viscosity at ambient temperature, ensuring excellent storage properties, and, at the same time, has a low viscosity at dispensing temperature. The wax additive shows a limited miscibility to the base component at room temperature. However, the wax can be melted and thus dissolves in the base component at dispensing temperature, which ensures a superior dispensing. At the same time, the wax is at least partially immiscible or immiscible to the base component at room temperature to enhance the grease shear thinning and to provide the grease composition with a relatively high viscosity at low shear rate. Therefore, the sealing performance of the grease composition can be enhanced.

In an embodiment, the dispensable grease sealant further comprises compressible rubber particles. The nature of the particles in not limited and such materials are known to the skilled person. Examples include silicone microspheres or hybrid silicone microspheres, and any combination thereof. The compressible rubber particles may be present in 20 wt % or less, 10 wt % or less, or 5 wt % or less, based on the total amount of the grease sealant. The compressible rubber particles may in embodiments have a particle diameter in the range of 1 µm to 500 µm, 5 µm to 250 µm, or 10 µm to 100 µm. The particle diameter is measured by a dynamic light scattering method. This ensures particularly advantageous properties.

The presence of the compressible rubber particles in the grease composition provides a better crimp processing window with force absorption and thus an improvement in the sealing performance due to forming solid barriers. In contrast to non-compressible additives, compressible rubber particles can be deformed under pressure to generate an enlarged barrier along a cable or an airflow direction and thus can provide a particularly improved sealing performance. Further, they can enhance the thixotropic behavior of the grease composition, which results in a better position stability, as well as an increased dispensing, sealing performance and crimp processing window.

A further suitable additive are polymer resin particles, such polyolefin powders, such as ultra-high molecular weight polyethylene (UHMWPE) powder. The particle diameter in not limited but may be in the range of 1 μm to 500 μm, 5 μm to 250 μm, or 10 μm to 100 μm. The particle diameter is measured by a dynamic light scattering method. Such particles act as spacers in the composition and prevent the damage of the sealing composition during the crimping process. Thus, the crimp processing window can be further broadened.

The present invention also concerns in a second embodiment a dispensable grease sealant, comprising a base component, a thickener and compressible rubber particles, wherein the base component is selected from the group comprising a silicone wax, a liquid rubber or a combination thereof.

The content of the base component in this second embodiment is not limited. The content of the base component may be lower than 50 wt %, such as 20 wt % or more, 30 wt % or more, or 40 wt % or more. In various embodiments, the base component is 50 wt % or more, 60 wt % or more, 65 wt % or more, 70 wt % or more, or 80 wt % or more. The upper limit of the amount of base component in the composition is also not limited. In other embodiments, the base component may be 95 wt % or less, or 98 wt % or less. The contents are based on the total amount of the sealant.

The inventors surprisingly found that the presence of the compressible rubber particles in the second embodiment has the result that the advantageous effects of the invention can be achieved even when the content of the base component is lower than 50 wt %, such as required in the first embodiment.

The specific nature of the base component, in combination with the presence of the compressible rubber particles, ensures that the dispensable grease sealant is dispensable at the dispensing temperature with a broad processing window. The dispensing temperature is not particularly limited, but is higher than ambient temperature of 25° C., and may be set to a temperature in the range of from 50° C. to 200° C., more preferably 60° C. to 150° C.

In particular embodiments, the dispensing temperature is approximately 100° C. The term "dispensable" defines that the grease sealant is able to be dispensed into a cavity of a crimp connection at the dispensing temperature. The device for dispensing the grease composition is not particularly limited and includes commonly known dispensing devices. The dispensing may be conducted by applying pressure.

A broad dispensing processing window means that the dispensing temperature and pressure may be varied relatively broadly, while still obtaining a sufficient dispensing. This broad processing window can be explained by the fact that the viscosity of the grease sealant is reduced during the dispensing process, which ensures that the grease conveniently flows into the cavity of a crimp connector. In this regard it has been found that the base component in accordance with the second embodiment has shear thinning characteristics, which means that it shows a thixotropic behavior under a shear as applied during the dispensing process. This ensures that the sealant composition can be successfully applied in high speed production processes.

In addition, an excellent sealing performance is achieved with the sealant of the second embodiment. During crimp application, a wire or cable is inserted into the cavity of the crimp connection and both cavity and inserted wire are compressed by the crimping process. The composition of the sealant of the second embodiment enables a sufficient fluidity of the sealant during the crimping process, so that the remaining cavities of the connector are completely filled and a good sealing and insulation of the cable/wire is ensured. If shear thinning characteristics are present, this allows even more that the grease composition easily flows even into small areas of the cavity. Thereby an excellent sealing is achieved. In view of this, the inventive dispensable grease sealant also provides an improved corrosion resistance.

Excellent sealing performance is particularly achieved, when a wire or cable that is inserted into the cavity of the crimp connection filled with the grease sealant, passes a thermal shock test according to standard IEC 60068-2-14. The crimp connection undergoes 100 cycles of a cooling and heating process from −40° C. to 125° C. The dwell time at low/high temperature is each 30 minutes, the transition duration between the temperature extremes needs to be shorter than 30 s. The electrical resistance of the wire after the thermal shock test must not exceed the initial resistance of the wire plus 2 mOhm. The inventive dispensable grease sealants all pass the thermal shock test.

A further test for evaluating the sealing performance is the cyclic salt spray test according to DIN EN 60068-2-52, where no wash out is allowed for proper protection against corrosion. This test is performed using "Nordic salt" (3%-salt solution, with 95% NaCl, 2.5% $MgCl_2$ and 2.5% $CaCl_2$) for 7 days with repeating salt spray and humidity exposure cycles. A sample passes this test, when the maximum resistance increases between 0.4 and 0.7 mOhms. The inventive dispensable grease sealants all pass the cyclic salt spray test.

Another test for the sealing performance is to test sealing against air pressure of up to 0.5 bar according to the Toyota specification TSC1232G. The parts need to seal against compressed air, which is applied to the not-connected part of the wire isolation. The crimped part is submerged in water and no air bubbles are allowed to appear up to a compressed air pressure of 0.5 bar. The inventive dispensable grease sealants all pass this sealing performance test.

Moreover, the specific base component according to the second embodiment ensures that the viscosity of the grease composition at ambient temperature of 25° C. and without application of shear is relatively high. In consequence, the storage stability becomes excellent, since the sealant composition completely remains in the cavity of the crimp connection. Required storage times are up to approximately 2 years. This also means that the sealant, during the crimping process, does not easily get dispensed to the outside of the crimp connector.

Further, the dispensable grease sealant according to the second embodiment ensures that crimping can be carried out over a broad processing window. This particularly means that the crimping application can be accomplished at high and low temperatures, including temperatures below 0° C. as well as higher temperatures during summer months or in industrial high temperature environments. This is an important aspect for end users. In embodiments, the dispensable grease sealant is suitable for automotive applications, which means that the sealant must withstand environmental temperatures of up to 125° C.

The dispensable grease sealant according to the second embodiment further comprises a thickener. The nature of the thickener is not limited. In an embodiment, the thickener is selected from the group comprising inorganic fillers, such as silica, or clay, organic fillers, such as a polymeric powder, metal components, such as lithium and/or calcium complexes, or any combination thereof. The amount of thickener is not particularly limited. Suitable exemplary amounts are in the range of from e.g. 0.1 to 40 wt %, such as 1 wt % to 30 wt %, 2 to 20 wt %, or 3 wt % to 15 wt %. The thickener enables a further adjustment of the viscosity of the dispensable grease sealant, in order to meet specific requirements in relation with excellent dispensing performance, sealing performance and storage stability, such as discussed above in connection with the base component. In addition, some fillers may also further improve the shear thinning properties of the composition.

In an embodiment, the thickener is fumed silica, since this component shows a strong shear thinning effect in the dispensable grease sealant. Polymeric fillers are another effective thickeners, since they have a similar density to the base component and thus allow an easy processing.

The dispensable grease sealant according to the second embodiment further comprises compressible rubber particles. The nature of the particles in not limited. Examples include silicone microspheres or hybrid silicone microspheres, or any combination thereof. The content of the compressible rubber particles is not limited. The compressible rubber particles may be present in 30 wt % or less, 20 wt % or less, 10 wt % or less, or 5 wt % or less, based on the total amount of the grease sealant. In an embodiment, the compressible rubber particles may be present in 0.1 wt % or more, 1 wt % or or more, or 2.5 wt % or more, based on the total amount of the grease sealant.

The presence of the compressible rubber particles in the grease composition according to the second embodiment provides a better crimp processing window with force absorption and thus an improvement in the sealing performance due to forming solid barriers. In contrast to non-compressible additives, compressible rubber particles can be deformed under pressure to generate an enlarged barrier along a cable or an airflow direction and thus can provide a particularly improved sealing performance. Further, they can enhance the thixotropic behavior of the grease composition, which results in a better position stability, as well as an increased dispensing, sealing performance and crimp processing window.

The compressible rubber particles may in embodiments have a particle diameter in the range of 1 µm to 500 µm, 5 µm to 250 µm, or 10 µm to 100 µm. The particle diameter is measured by a dynamic light scattering method. This ensures particularly advantageous properties.

In an embodiment, the viscosity of the dispensable grease sealant according to the second embodiment at ambient temperature of 25° C. is dependent on the applied shear rate, which means that particularly sufficient shear thinning characteristics are exhibited. Namely, the viscosity at 25° C. at a shear rate of 0.1 s$^{-1}$ is 1000 Pa·s or more, 5000 Pa·s or more, or 10000 Pa·s or more, and that the viscosity at 25° C. at a shear rate of 1000 s$^{-1}$ 100 Pa·s or less, 10 Pa·s or less, or 1 Pa·s or less. This ensures a particularly improved sealing performance.

The viscosity is measured as follows: A sample is analyzed on a TA Instruments ARES-G2 rotational rheometer equipped with Advanced Peltier System (APS) and an upper 25 mm stainless steel parallel plate fixtures. The APS is capable of temperature accuracy of ±0.1° C. enabled by a platinum resistance thermometer (PRT). By means of a spatula, the sample is deposited onto an APS flat plate. After adjusting the measurement temperature, the sample is compressed to achieve the desired gap pre-set to 1.2 mm. A steady rotational shear is executed to measure the viscosity from 0.1 s$^{-1}$ to 1000 s$^{-1}$. An APS plate split solvent trap is used to avoid the drying of the sample and moisture uptake.

Alternatively or additionally, the viscosity of the dispensable grease sealant at elevated temperatures is dependent on the applied shear rate. This particularly means that at 100° C. and at a shear rate at 0.1 s$^{-1}$, the viscosity is 10 Pa·s or more, 100 Pa·s or more, or 1000 Pa·s or more, and at a shear rate at 100° C. and at 1000 s$^{-1}$, the viscosity is 10 Pa·s or less, 1 Pa·s or less, or 0.5 Pa·s or less. This ensures particularly improved dispensing properties. The shear rate is measured by adjusting a certain shear rate and measuring the viscosity as above.

In an embodiment, the base component according to the second embodiment is thixotropic at ambient temperature of 25° C. and at the dispensing temperature. The term "thixotropic" means that the viscosity of the base component decreases upon application of shear and is a synonym for good shear thinning characteristics. Thixotropic properties of the base component are particularly efficient to adjust the desired viscosity properties of the dispensable grease sealant. Therefore, the dispensing and sealing performance of the grease sealant can be further improved.

One embodiment of the base component is a silicone wax. Silicone waxes are solid at ambient temperature of 25° C. Thus, they ensure excellent storage properties, even when using a relatively low amount of thickener. Further, particularly favorable viscosity and thixotropic properties can be achieved by employing a silicone wax as the base component. Thus, the dispensing and sealing performance becomes excellent. The nature of the silicone wax is not particularly limited. The wax can include siloxane based repeating units, which may be selected among those customary for silicone waxes and which include alkyl- or aryl-substituted siloxane repeating units. Suitable examples are dimethylsiloxane derived waxes or waxes with mixed alkyl residues or copolymers of different siloxane repeating units. In an embodiment, polydimethylsiloxanes may be used, optionally modified with a high molecular weight hydrocarbon. In an embodiment, the silicon wax is a methylsiloxane polymer, such as an ethylene methylsiloxane co-polymer. In an embodiment, the silicone wax is a block copolymer of ethylene and methylsiloxane. In another embodiment, the silicone wax is a silicone copolymer containing a hydrocarbon chain, having 6 or more carbon atoms. Suitable silicone waxes are commercially available. Suitable silicone waxes are for instance Dow Corning® SW-8005 C30 (C30-45 alkyldimethylsilyl-polypropylsilsesquioxane).

In an embodiment, the silicone wax has a viscosity at 25° C. of 1000 Pa·s or more, 5000 Pa·s or more, or 10000 Pa·s or more, and/or a viscosity at 100° C. of 1000 Pa·s or less, 100 Pa·s or less, or 10 Pa·s or less. Alternatively or additionally, the silicone wax has a melting and/or softening temperature of 35° C. or higher and a melting and/or softening temperature of equal to or lower than dispensing temperature. These properties ensure particularly preferred dispensing and sealing performances. The viscosity is measured as described above with a shear rate of 0.1 s$^{-1}$.

The base component may also be a liquid rubber. Liquid rubbers have the advantage that they are commercially available at low costs. Further, they do not emit any volatiles during storage and operation. "Liquid" in terms of the present application means that the viscosity at ambient temperature of at 25° C. is 100000 Pa·s or less. The liquid rubber shows a rather high viscosity in order to reduce oil release and to improve the sealing properties and the storage properties. Thus, the viscosity of the liquid rubber may be 75000 Pa·s or less, or 50000 Pa·s, at ambient temperature of 25° C. The viscosity is measured as described above with a shear rate of $0.1\ s^{-1}$. The nature of the liquid rubber is not limited. The rubber may be synthetic or natural rubbers, such as polybutylene rubbers, polyisoprene rubbers nitrile rubbers, etc. Suitable liquid rubbers are commonly known and commercially available.

These two components for the base component can be used alone or in combination in order to exhibit the combination of favorable effects. If used in combination, favorable weight ratios are from 10:90 to 90:10, 25:75 to 75:25, or 50:50. A combination of the two components ensures a particularly balanced performance.

In various embodiments, the dispensable grease sealant according to the second embodiment further comprises one or more additives. The nature of the additive is not limited. In an embodiment, the additive is selected from the group comprising antioxidants, antiwear additives, extreme pressure additives, corrosion inhibitors, colorants, and fluorescence agents, and any combination thereof. These additives are commonly known and may be added upon the circumstances in order to impart the sealant composition with the desired properties. Each additive typically is present in an amount of 2 wt % or less, 1 wt % or less, or 0.5 wt % or less, based on the total amount of the grease sealant. The total amount of such additives typically is 5 wt % or less, such as from 1 to 5 or 2 to 4 wt %.

In an embodiment, the dispensable grease sealant may further comprise a wax additive. The term "wax additive" means a wax in addition to the silicone wax that is employed as the base component. The nature of the wax is not limited as far as it is different from the silicone wax. The wax additive may be selected from the group comprising a plant- or animal-derived wax, a petroleum-derived wax or a synthetic wax. Examples of suitable wax additives include hydrocarbon waxes, polyethylene waxes, polypropylene waxes, paraffin waxes, fluor-containing waxes, such as fluorocarbon waxes, microcrystalline waxes, such as polypropylene-based micropowders, silicone waxes, or any combination thereof. In an embodiment the wax additive is present in case, when the base component is selected from a liquid rubber, since the viscosity and the viscosity temperature/shear thinning properties can be then adjusted in an excellent way. Furthermore, the wax additive works as a thickener at ambient temperature. The wax additive may be present in an amount of 50 wt % or less, 30 wt % or less, or 20 wt % or less, based on the total amount of the grease sealant.

In an embodiment, the base component and the wax additive are immiscible or only partially miscible at 25° C. and that the base component and the wax additive are miscible at the dispensing temperature. Such a behavior particularly ensures that the grease sealant has a high viscosity at ambient temperature, ensuring excellent storage properties, and, at the same time, has a low viscosity at dispensing temperature. The wax additive shows a limited miscibility to the base component at room temperature. However, the wax can be melted and thus dissolves in the base component at dispensing temperature, which ensures a superior dispensing. At the same time, the wax is at least partially immiscible or immiscible to the base component at room temperature to enhance the grease shear thinning and to provide the grease composition with a relatively high viscosity at low shear rate. Therefore, the sealing performance of the grease composition can be enhanced.

A further suitable additive are polymer resin particles, particularly polyolefin powders, such as UHMWPE powder. The particle diameter in not limited but may be in the range of 1 µm to 500 µm, 5 µm to 250 µm, or 10 µm to 100 µm. The particle diameter is measured by a dynamic light scattering method. Such particles act as spacers in the composition and prevent the damage of the sealing composition during the crimping process. Thus, the crimp processing window can be further broadened.

Further, the present invention is concerned with a method for producing the dispensable grease sealant. The method comprises mixing the components of the dispensable grease sealant. The mixing can be conducted by conventional methods and inter alia includes a mixing with planetary mixers. The method ensures that the dispensable grease sealant in accordance with the present invention can be produced in a convenient and cost effective manner. The method is applicable for producing dispensable grease sealants according to the first and the second embodiment. The method can be used to prepare a dispensable grease sealant according to the first and the second embodiment.

In an embodiment, the mixing is conducted at a temperature, which is higher than the melting temperature of any wax component that is employed in the composition. Such a process set-up ensures that the wax component can be sufficiently mixed with the other components of the composition. The melting temperature is the onset Tg as measured with differential scanning calorimetry (DSC) at a heating rate of 10° C./min.

The present invention also concerns a crimp connector, comprising a cavity, which is at least partially filled with the dispensable grease sealant. Crimp connectors used for crimp connections are commonly known and are produced in high numbers by commonly known methods, such as by stamping processes of metallic precursor parts with speeds of up to 1000 parts/min. The term "filled with the dispensable grease sealant" means that at least an inner surface of the crimp connection is at least partially covered with the grease composition. The dispensing of the grease sealant into the cavity of the crimp connection be conducted easily with a broad processing window due to the specific properties of the grease sealant. Further, the crimp connection shows a high storage stability of up to 2 years, since the grease sealant has an excellent position stability. This means that the grease sealant does not flow under storage conditions and thus remains at the dispensed position. Moreover, the sealing performance is excellent, which results in a good corrosion stability of the crimp connection. In addition, a wire or cable can be easily and conveniently joined to the crimp connection with a high processing window. The cavity of the crimp connector may be filled with a dispensable grease sealant according to the first and/or the second embodiment.

The present invention also concerns a method for producing a crimp connector comprising the sealant, comprising dispensing the dispensable grease sealant into a cavity of the crimp connector, and cooling the crimp connector to ambient temperature. The dispensing devices and process conditions for dispensing the grease composition in the cavity of the crimp are commonly known. Appropriate amounts of the grease sealant to be dispensed depend on the size of the crimp and are usually in the range of from 0.1 mg to 10 mg. The specific nature of the dispensable grease sealant ensures that the dispensability of the grease composition is excellent. Thus, the crimp connection can be produced in a convenient and efficient manner in high amounts. The crimp connector can be prepared by using a dispensable grease sealant according to the first and the second embodiment.

Further, the present invention concerns the use of the dispensable grease sealants for sealing at least one end of a wire or cable, which is joined to a crimp connection. Dispensable grease sealant according to the first and the second embodiment are suitable for this use.

The following are materials are used for producing the exemplary dispensable grease compositions:

Additive I: Hybrid silicone powder KMP600 compressible particles (particle size distribution 1~15 μm) as available from Shin-Etsu The exemplary dispensable grease sealants are produced by mixing the respective materials in the amounts as identified in Table 1 below in a commonly known planetary mixing device. The thickener and additives are mixed with the preheated base component in a Flacktek DAC 150.1 FVZ speed mixer at 1500 rpm for 2 minutes and at 3000 rpm for another 2 minutes.

Table 1 also summarizes the viscosities of examples 1 to 5 and Comparative Example 8 as measured at 25° C. and 100° C. and at shear rates of 1 $s^{-1}$ and 1000 $s^{-1}$. The viscosity is measured by a TA Instruments ARES-G2 rotational rheometer equipped with Advanced Peltier System (APS) and an upper 25 mm stainless steel parallel plate fixture.

TABLE 1

| Example | Base component | Thickener | Additive | Viscosity @ 25° C. (Pa · s, 0.1 $s^{-1}$) | Viscosity @ 25° C. (Pa · s, 1000 $s^{-1}$) | Viscosity @ 100° C. (Pa · s, 0.1 $s^{-1}$) | Viscosity @ 100° C. (Pa · s, 1000 $s^{-1}$) | Dispensing performance | Sealing performance |
|---|---|---|---|---|---|---|---|---|---|
| 1 | A 92.59 wt % | D 7.41 wt % | — | 25022 | 0.17 | 1901.00 | 0.38 | excellent | excellent |
| 2 | A 97.09 wt % | D 2.91 wt % | — | 3300 | 1.11 | 39.62 | 0.03 | excellent | excellent |
| 3 | A 95.24 wt % | E 4.76 wt % | — | 3796 | 0.29 | 24.14 | 0.02 | excellent | excellent |
| 4 | A 90.91 wt % | D 2.73 wt % | G 6.36 wt % | 7215 | 0.74 | 70.44 | 0.02 | excellent | excellent |
| 5 | B 31.65 wt % + C 63.29 wt % | D 5.06 wt % | — | 48361 | 1.12 | 722.00 | 0.21 | excellent | excellent |
| 6 | C 76.17 wt % | D 6.50 wt % | H 20.33 wt % | 51370 | 0.03 | 2324.00 | 0.42 | excellent | excellent |
| 7 | A 84.75 wt % | D 6.78 wt % | I 8.47% | 20509.8 | 2.84 | 597.97 | 0.73 | excellent | excellent |
| 8 (comp. ex.) | C 100.00% | | | 72.62 | 8.64 | 0.79 | 0.31 | poor | poor |

Base component A: ethylene siloxane blockcoplymer EDEB321 as available from the Gelest, Inc. (pour point: 44-45° C.; viscosity 0.065 Pa·s at 55° C.)
Base component B: alkylmethylsiloxane wax DOW 2503 as available from Dow (softening point: 32° C.; viscosity: 0.040 Pa·s at 40° C.)
Base component C: polybutene liquid rubber H300 as available from Ineos Oligomers
Thickener D: CAB-O-SIL® HS-5 fumed silica as available from Cabot
Thickener E: AEROSIL® R 972 fumed silica as available from Evonik
Additive G: Micropro400 modified polypropylene wax micropowder (melting point: 140-143° C.; density at 25° C.: 0.93 g/cc; mean particle size: 4.5-7.5 μm) as available from Micro Powders, Inc
Additive H: Paraffin wax (melting point: 58-62° C.) as available from Aldrich It was confirmed that the dispensing performance of the dispensable grease sealant compositions according to Examples 1 to 7 is excellent, whereas the dispensing performance of Comparative Example 8 is insufficient.

Further, it was confirmed that the sealing performance of crimp connections comprising dispensable grease sealant compositions according to Examples 1 to 7 is excellent, since the examples all passed the thermal shock test, the cyclic salt spray test, and the sealing performance against air pressure of up to 0.5 bar as described above. In contrast, Comparative Example 8 did not pass these tests.

What is claimed is:
1. A dispensable grease sealant, comprising:
   a base component in an amount of 50 wt % or more, based on a total weight of the sealant, the base component including a silicone wax and a liquid rubber, the silicone wax having at least one of a melting or softening temperature of 35° C. or higher, the at least one of the melting or softening temperature is equal to or lower than a dispensing temperature of 50° C. to 200° C.;
a thickener; and
a plurality of compressible rubber particles including at least one of a plurality of silicone microspheres or a plurality of hybrid silicone microspheres.

2. The dispensable grease sealant of claim 1, wherein the amount of the base component is 95 wt % or more.

3. The dispensable grease sealant of claim 1, wherein the plurality of compressible rubber particles each have a particle diameter less than 500 μm.

4. The dispensable grease sealant of claim 1, wherein the silicone wax is a methylsiloxane polymer, the silicone wax has a viscosity at 25° C. and at a shear rate of 0.1 s$^{-1}$ of 1000 Pa·s or more, and/or a viscosity at 100° C. at a shear rate of 0.1 s$^{-1}$ of 1000 Pa·s or less.

5. A dispensable grease sealant, comprising:
a base component including a silicone wax and a liquid rubber, wherein the silicone wax is a methylsiloxane polymer having at least one of a viscosity at 25° C. and at a shear rate of 0.1 s$^{-1}$ of 1000 Pa·s or more, or a viscosity at 100° C. at a shear rate of 0.1 s$^{-1}$ of 1000 Pa·s or less;
a thickener; and
a plurality of compressible rubber particles including at least one of a plurality of silicone microspheres or a plurality of hybrid silicone microspheres.

6. The dispensable grease sealant of claim 5, wherein an amount of the base component is 95 wt % or more based on a total weight of the sealant.

7. The dispensable grease sealant of claim 5, wherein the plurality of compressible rubber particles each have a particle diameter less than 500 μm.

8. The dispensable grease sealant of claim 5, wherein a viscosity of the sealant is dependent on a shear rate, the viscosity at 25° C. at a shear rate of 0.1 s$^{-1}$ is 1000 Pa·s or more and at a shear rate of 1000 s$^{-1}$ is 100 Pa·s or less.

9. The dispensable grease sealant of claim 8, wherein the viscosity of the sealant at 100° C. at a shear rate of 0.1 s$^{-1}$ is 10 Pa·s or more and at a shear rate of 1000 s$^{-1}$ is 10 Pa·s or less.

10. The dispensable grease sealant of claim 5, wherein the base component is thixotropic at 25° C. and at a dispensing temperature, the dispensing temperature is 50° C. to 200° C.

11. The dispensable grease sealant of claim 5, wherein the silicone wax has a melting and/or softening temperature of 35° C. or higher, the melting and/or softening temperature is equal to or lower than a dispensing temperature of 50° C. to 200° C.

12. The dispensable grease sealant of claim 5, wherein the thickener is selected from a group including inorganic fillers, organic fillers, metal components, or any combination thereof.

13. The dispensable grease sealant of claim 5, further comprising a wax additive, the wax additive selected from a group including a plant- or animal-derived wax, a petroleum-derived wax, a synthetic wax, or any combination thereof.

14. The dispensable grease sealant of claim 13, wherein the base component and the wax additive are immiscible or only partially miscible at 25° C., the base component and the wax additive are miscible at a dispensing temperature of 50° C. to 200° C.

15. A dispensable grease sealant, comprising:
a base component including a silicone wax and a liquid rubber;
a thickener; and
a plurality of compressible rubber particles including a plurality of silicone microspheres having a particle diameter in a range of 5 μm to 250 μm.

16. The dispensable grease sealant of claim 15, wherein an amount of the base component is 95 wt % or more based on a total weight of the sealant.

17. The dispensable grease sealant of claim 16, wherein the particle diameter is in a range of 10 μm to 100 μm.

18. The dispensable grease sealant of claim 15, wherein the silicone wax has at least one of a melting or softening temperature of 35° C. or higher, the at least one of the melting or softening temperature is equal to or lower than a dispensing temperature of 50° C. to 200° C.

* * * * *